United States Patent
Linden et al.

(10) Patent No.: US 8,251,438 B2
(45) Date of Patent: Aug. 28, 2012

(54) FRONT-END STRUCTURE OF A MOTOR VEHICLE

(75) Inventors: Bernd Linden, Neunkirchen-Seelscheid (DE); Bert Niessen, Heimbach (DE); Joergen Hilmann, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/350,225

(22) Filed: Jan. 13, 2012

(65) Prior Publication Data
US 2012/0181818 A1 Jul. 19, 2012

(30) Foreign Application Priority Data

Jan. 13, 2011 (DE) .......................... 10 2011 002 636

(51) Int. Cl.
*B60R 19/02* (2006.01)
*B62D 25/08* (2006.01)
*B60R 24/34* (2006.01)

(52) U.S. Cl. ........... 296/187.09; 296/193.1; 296/187.04; 180/68.4; 293/115

(58) Field of Classification Search ............. 296/187.04, 296/187.09, 193.1, 203.02; 180/68.4, 68.6; 293/115
See application file for complete search history.

(56) References Cited

U.S. PATENT DOCUMENTS

| | | | | |
|---|---|---|---|---|
| 3,792,889 | A * | 2/1974 | Fuener et al. | 293/115 |
| 4,541,645 | A * | 9/1985 | Foeldesi | 180/68.4 |
| 5,326,133 | A * | 7/1994 | Breed et al. | 280/735 |
| 5,810,427 | A * | 9/1998 | Hartmann et al. | 296/187.03 |
| 6,318,450 | B1 * | 11/2001 | Acre | 165/67 |
| 8,002,072 | B2 | 8/2011 | Schmahl | |
| 2007/0040414 | A1* | 2/2007 | Frederick et al. | 296/187.09 |
| 2008/0272608 | A1* | 11/2008 | Schmahl | 293/115 |
| 2011/0241378 | A1* | 10/2011 | Steller | 296/187.09 |
| 2011/0272967 | A1* | 11/2011 | Davisdon et al. | 296/193.1 |
| 2012/0104797 | A1* | 5/2012 | Hilmann et al. | 296/187.09 |

FOREIGN PATENT DOCUMENTS

WO 2007065629 A1 6/2007

* cited by examiner

*Primary Examiner* — Jason S Morrow
(74) *Attorney, Agent, or Firm* — Greg P. Brown; Brooks Kushman P.C.

(57) ABSTRACT

Forward structure of a motor vehicle includes a frame structure, a bumper beam disposed forward of and connected to the frame structure, and a radiator frame disposed forward of the frame structure and behind the bumper beam. First and second swing arms are connected to the radiator frame at respective first and second forward pivot axes and are connected to the frame structure at respective first and second rear pivot axes. The four pivot axes are substantially parallel to one another and substantially transverse to the vehicle, such that a frontal impact urging the bumper beam rearward against the radiator frame causes the radiator frame to pivot about the swing arms. Forward-most portions of the frame structure, immediately adjacent to the bumper beam, may take the form of deformation elements or crush cans that are designed to yield in a manner to absorb crash energy.

12 Claims, 4 Drawing Sheets

FRONT-END STRUCTURE OF A MOTOR VEHICLE

CROSS-REFERENCE TO RELATED APPLICATIONS

This application claims foreign priority benefits under 35 U.S.C. §119(a)-(d) to DE 10 2011 002 636.3, filed Jan. 13, 2011, which is hereby incorporated by reference in its entirety.

TECHNICAL FIELD

The invention relates to a front end structure of a motor vehicle having radiator support frame that is movably mounted to the vehicle frame for pivoting movement during a crash or impact.

BACKGROUND

It is known to design the front end structure of motor vehicles (sometimes referred to as a front module) so that, in the event of a collision, energy is absorbed in a targeted or controlled manner. Ideally, this will result in the protection of both the vehicle occupants and of pedestrians who come into contact with the vehicle, in particular at relatively low vehicle speeds.

In particular, it is known to mount the radiator of the vehicle to supporting structure in a manner that, under certain crash conditions, allows the radiator to move relative to (or "break away" from) surrounding structure with the aim of absorbing crash energy.

SUMMARY

In a first disclosed embodiment, a front-end structure for a motor vehicle comprises left and a right deformation members (such as crush cans, for example) mounted forward of a front frame structure, and supporting a generally transverse bumper beam. A radiator frame is disposed forward of the frame structure and behind the bumper beam and is mounted to the frame structure by a left pair of swing arms and a right pair of swing arms. The arms making up each pair are disposed in an over-under arrangement relative to one another, and each swing arm is connected to the radiator frame at a forward pivot axis and is connected to the frame structure at a rear pivot axis. The four pivot axes are substantially parallel to one another and substantially transverse to the vehicle, such that in a frontal impact that deforms the deformation members sufficiently to urge the bumper beam rearward against the radiator frame, the radiator frame pivots about the swing arms. The radiator and radiator frame are thus able to move upwardly and to the rear.

In another embodiment, a motor vehicle comprises a forward frame structure, a bumper beam disposed forward of and connected to the frame structure, and a radiator frame disposed forward of the frame structure and behind the bumper beam. First and second swing arms are connected to the radiator frame at respective first and second forward pivot axes and are connected to the frame structure at respective first and second rear pivot axes. The four pivot axes are substantially parallel to one another and substantially transverse to the vehicle, such that a frontal impact urging the bumper beam rearward against the radiator frame causes the radiator frame to pivot about the swing arms.

BRIEF DESCRIPTION OF THE DRAWINGS

The invention is shown by way of example in the drawings and described hereinafter in detail with reference to the drawings, in which.

DETAILED DESCRIPTION

Figure 1:
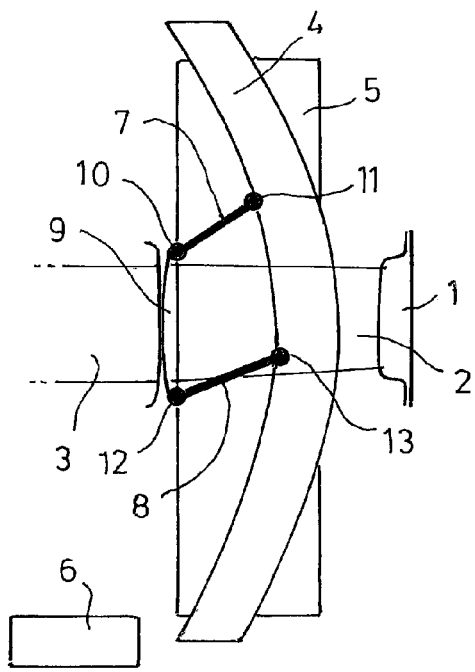
FIG. 1 shows in a schematic view the side view of an exemplary embodiment of the front module in the non-deformed state.

As seen in FIG. 1, the front-end structure of a vehicle consists of a front bumper beam 1 mounted forward of and connected to a vehicle frame structure 3. In the embodiment depicted, the forward-most portion of frame structure 3, adjacent to bumper beam 1, takes the form of a deformation element 2, which is a component designed to yield under crash loads applied to bumper beam 1 in order to absorb energy and thereby reduce the crash pulse transmitted to occupants of the vehicle. In the automotive structures field, deformation element 2 may also commonly be referred to as a "crush can."

It is to be understood that while the side views presented here only depict one deformation element 2, in a typical vehicle there are at least two deformation elements located adjacent the outboard sides of the vehicle frame structure to support bumper beam 1 adjacent its left and right ends. In such installations, it is common for the deformation elements 2 to be located immediately forward of longitudinally extending vehicle frame rails.

The terms "frame" and "frame structure" as used herein is meant to refer to any one or more of the major load-bearing elements of a vehicle, regardless of whether the vehicle is an example of body-on-frame, uni-body, or any other form of vehicle construction.

The front-end structure or module further includes a radiator frame 4 substantially centrally located relative to the vehicle, between left and right deformation elements 2. Radiator frame 4 supports a radiator 5.

The radiator frame 4 may be configured to be curved in the direction of the front face of the vehicle, and as the convex bulged portion is able to be pushed in, provides an additional element for absorbing the impact energy.

A lower frame part 6 is shown configured as a crossmember and may be arranged in the lower region of the front-end module.

The radiator frame 4 is supported by upper and lower swing arms 7, 8 which are articulated on both sides of the front module. Rear ends of swing arms 7, 8 may be connected to a retaining element 9 that is, in turn, connected fixedly to the frame structure 3. Forward ends of swing arms 7, 8 are connected to radiator frame 4.

The rear and forward pivot axes 10, 11 of the upper swing arm 7 and the rear and forward pivot axes 12, 13 of the lower swing arm 8 are preferably arranged parallel to one another and substantially horizontally, and thus form a four-bar linkage.

Figure 2:
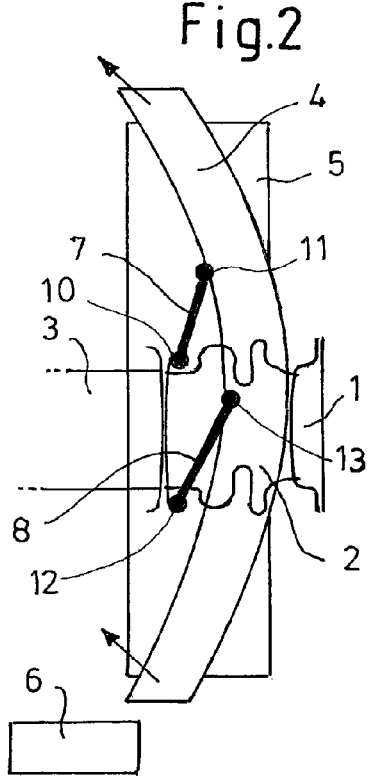
FIG. 2 shows the same side view as FIG. 1 after an impact, the deformation element being deformed and the radiator frame being displaced with the radiator.

As is revealed from FIG. 1, the four-bar linkage is designed so that the swing arms 7 and 8 are arranged to be inclined upward and forwardly, in the direction of travel of the vehicle. That is, forward pivot axes 11, 13 are positioned higher than their respective rear pivot axes 10, 12. This has the effect that, as illustrated in FIG. 2, when bumper beam 1 is urged rearward into contact with radiator frame 4 and/or radiator 5, radiator frame 4 along with radiator 5 may be pivoted upward and to the rear.

In the case of an impact, the bumper beam 1 initially comes to bear against the radiator frame 4 after initial energy-absorbing deformation of the deformation element 2. With continued energy-absorbing deformation of the deformation element 2 and/or multiple deformation elements, radiator frame 4 is moved to the rear and upward by pivoting of the swing arms 7 and 8.

The sequence of movement of the radiator frame 4 is oriented substantially according to the configuration of the four-bar linkage, which may be varied in any manner by altering the length of the swing arms 7 and 8 and the arrangement of the pivot axes 10, 11, 12, 13.

Figure 3:
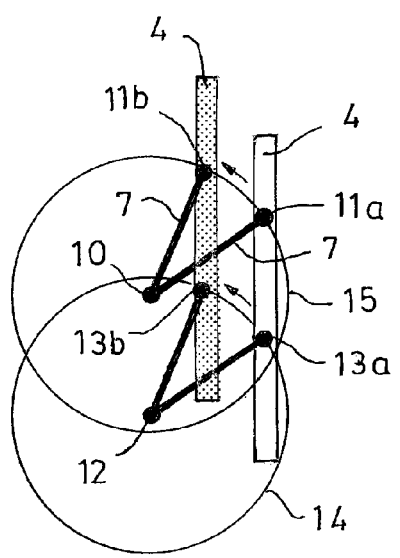
FIG. 3 shows a schematic view of an exemplary embodiment of the four-bar linkage formed by the swing arms.
Figure 4:
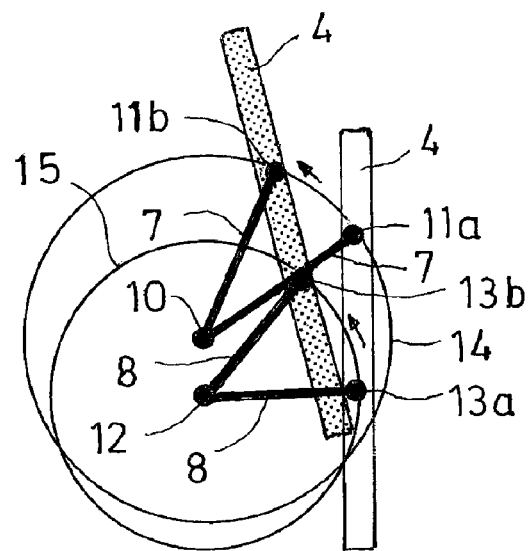
FIG. 4 shows a further exemplary embodiment for forming the four-bar linkage.
Figure 5:
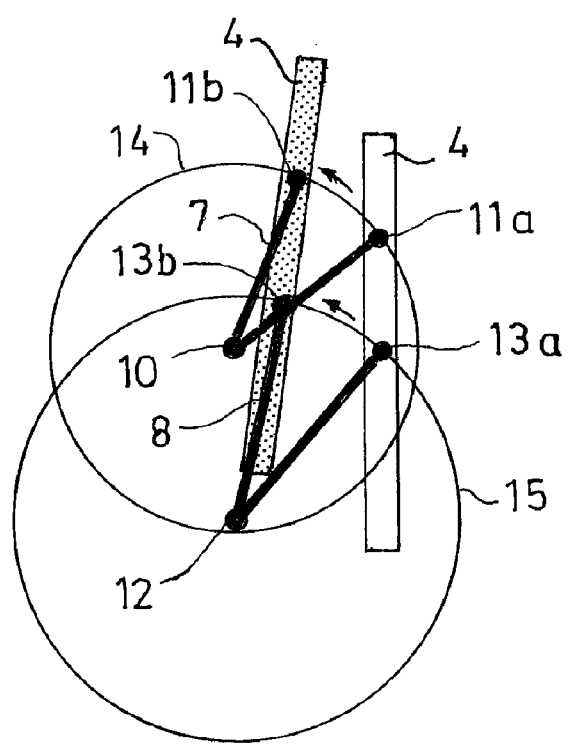
FIG. 5 shows a further exemplary embodiment of the four-bar linkage.

In FIGS. 3 to 5, three possible alternative embodiments are shown in schematic form.

In all three embodiments, the rear axes 10, 12 of the swing arms 7, 8 connected to the retaining element 9 are disposed in an over-under arrangement a distance above/below one another in a substantially vertical plane.

Proceeding from this structure, in the exemplary embodiment of FIG. 3, the swing arms 7 and 8 are configured to be of equal length and arranged parallel to one another. In such a construction, in the event of an impact, the radiator frame with the radiator is pivoted to the rear and upward and maintains an upright (not tilted) position.

As the bumper beam 1 moves rearward (as permitted by deformation of the deformation element or elements 2) and urges the radiator frame 4 rearward, the forward axes 11, 13 of the swing arms 7, 8 move along circular paths 14, 15 of the same size, in each case about the respective rear axes 10, 12, from the position 11*a*, 13*a* into the position 11*b*, 13*b*. In the movement sequence produced thereby, the radiator frame 4 is raised, maintaining a generally vertical orientation, and at the same time moved to the rear in the direction of a passenger compartment (not shown) of the vehicle.

In the embodiment shown in FIG. 4, the upper swing arm 7 is configured to be longer than the lower swing arm 8 so that the forward axis 11 of the upper swing arm 7 moves on a circular path 14 of larger radius than the path 15 tracked by the forward axis 13 of the lower swing arm 8.

The configuration of the four-bar linkage shown in FIG. 4 not only causes the radiator frame 4 to be raised and moved to the rear but at the same time to perform a tilting movement in which the upper end of the radiator frame 4 is tipper farther to the rear than the lower end.

Such a construction may be advantageous if the radiator frame 4 with the radiator 5, taking into account the fittings of the engine compartment, is intended to be tilted over an obstruction, for example the engine block (not shown).

In the embodiment shown in FIG. 5, the design of the four-bar linkage is selected so that the upper swing arm 7 is configured to be shorter than the lower swing arm 8. Moreover, the design of the four-bar linkage provides that the vertical distance or spacing between the rear axes 10, 12 is greater than the vertical distance or spacing between the forward axes 11, 13. In the event of an impact, in which the bumper beam 1 presses against the radiator frame 4, the forward axis 11 of the upper swing arm 7 moves on a smaller circular path 14 from the position 11*a* to the position 11*b*, whilst the forward axis 13 of the lower swing arm 8 moves around the axis 12 on a larger circular path 15 from a position 13*a* into a position 13*b*.

The effect of this movement sequence is that the radiator frame 4 is not only raised and pivoted to the rear but at the same time is also tilted, the tilting angle being oriented in the opposite direction than in the exemplary embodiment shown in FIG. 4. The lower end of the radiator frame 4 is then moved closer to the passenger compartment during the pivoting movement than the upper end.

As may be seen, the distances between the axes of the swing arms provided on the retaining element and the axes of the swing arms provided on the radiator frame may be different, so that the swing arms are arranged at an angle to one another. If in such an exemplary embodiment the upper swing arm is configured to be longer than the lower swing arm, a movement of the radiator frame is achieved in which it is not only lifted up and pivoted to the rear but it also adopts a tilted position in which the upper region of the radiator frame pivots further to the rear than the lower region. Such a movement mechanism may be advantageous, for example, if in the upper engine compartment, for example above the engine block, there is sufficient space into which the radiator can be moved.

If, however, the upper swing arm is configured to be shorter than the lower swing arm, the radiator frames with the radiator pivots not only to the rear and upward but also into an inclined position in which the lower region of the radiator frame pivots further to the rear than the upper region. Accordingly, it behaves in the opposite manner if the upper swing arm is longer than the lower swing arm.

The tilting movement of the radiator frame with the radiator to the rear may be further reinforced by the distance between the axes arranged on the retaining element being selected to be shorter than the distance between the axes arranged on the radiator frame, the upper swing arm being longer than the lower swing arm.

The forwardly oriented tilting movement may be reinforced by the distance between the axes arranged on the retaining element being greater than the distance between the axes arranged on the radiator frame, the upper swing arm being configured to be shorter than the lower swing arm.

The three embodiments shown in FIGS. 3 to 5 may be selected according to various applicable packaging constraints, such the space available in the engine compartment. Any other variants of the four-bar linkage which achieve a different movement sequence of the radiator frame 4 are possible, as will be apparent to a person of skill in the art.

Figure 6:
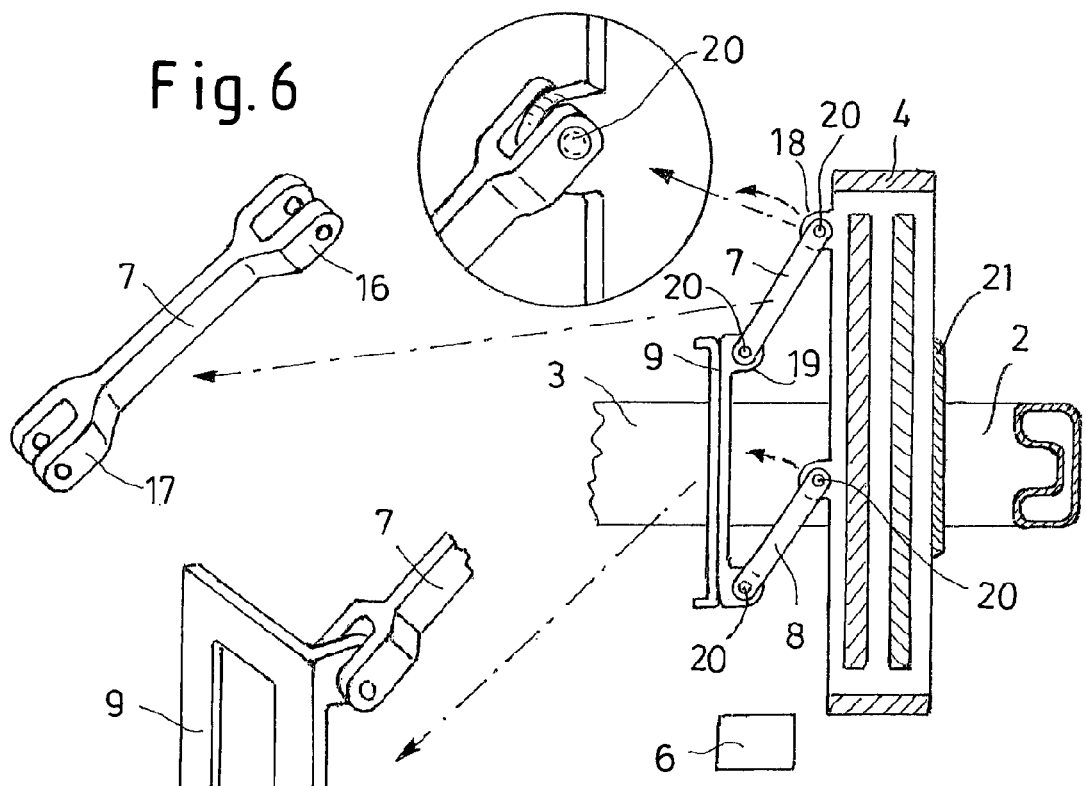
FIG. 6 shows a section through a practical embodiment of the front module in the non-deformed state.
Figure 7:
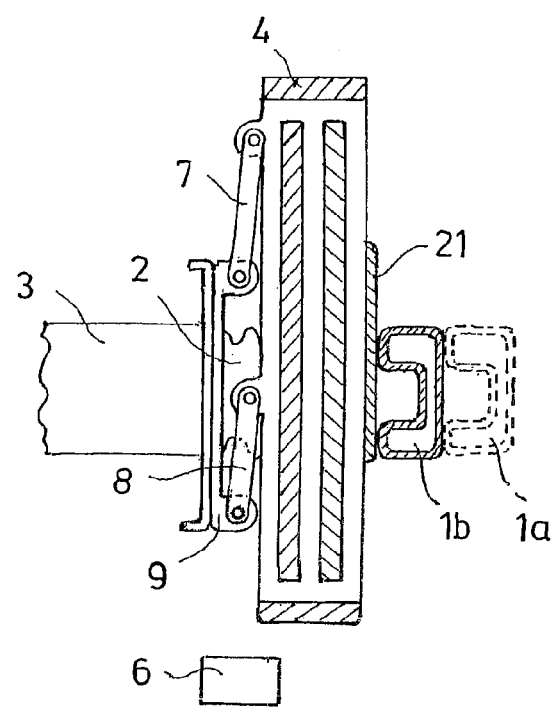
FIG. 7 shows the same section of the front module as in FIG. 6 but in the deformed state.

The technical design of the front-end structure which is shown more schematically in FIGS. 1 to 5 is illustrated in more detail in FIGS. 6 and 7.

For example, the swing arms 7, 8, in particular in the form of the swing arm 7, are shown in terms of construction. The swing arms 7 and 8 are provided at both ends with claws 16 and 17, with which they engage over eyes 18, 19, which are provided on the radiator frame 4 and/or the retaining element 9. By means of a pin-shaped element 20, they are pivotably fastened to the respective eye 18, 19. Eyes 18, 19 and the related pin elements 20 provide rear pivot points supporting the rear pivot axes of swing arms 7, 8.

In the example construction shown in FIGS. 6 and 7, on both sides of the radiator frame 4 level with the bumper beam 1 one respective contact block 21 is arranged, on which the bumper beam 1 comes to bear after a specific amount of deformation of the deformation element 2. The last-mentioned position after deformation of the deformation element 2 is illustrated in FIG. 7, in which the bumper beam 1 has been forced out of the position 1a into the position 1b and then comes to bear against the contact block 21, which preferably consists of resilient material, whereby the radiator frame 4 is displaced in the direction of the passenger compartment and at the same time lifted up.

The construction shown in FIGS. 6 and 7 may, for example, be designed according to any of the three basic models shown in FIGS. 3 to 5, the construction of the four-bar linkage and the movement sequence of the radiator frame 4 associated therewith not being subjected to any restrictions.

Figure 8A:
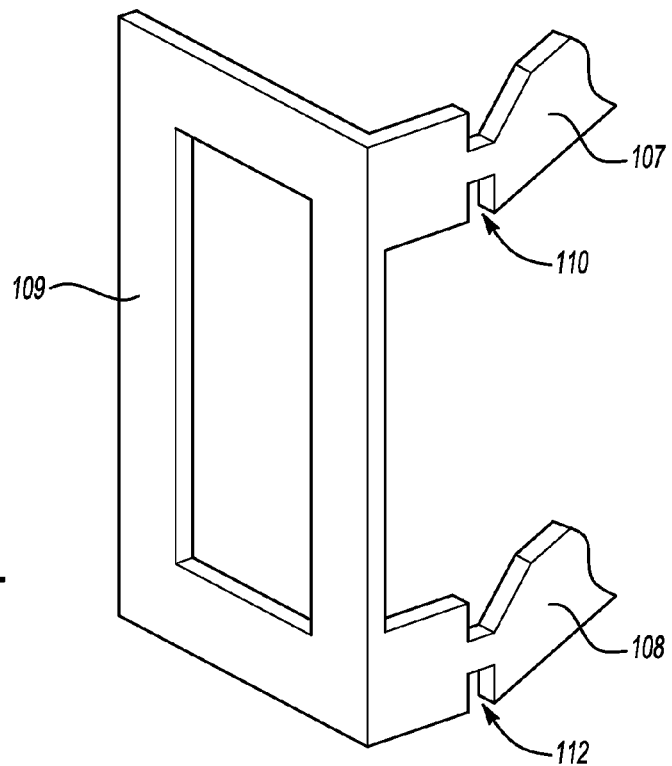
FIG. 8A shows an embodiment wherein rear pivot axes to the swing arms are provided by plastically deformable joints.
Figure 8B:
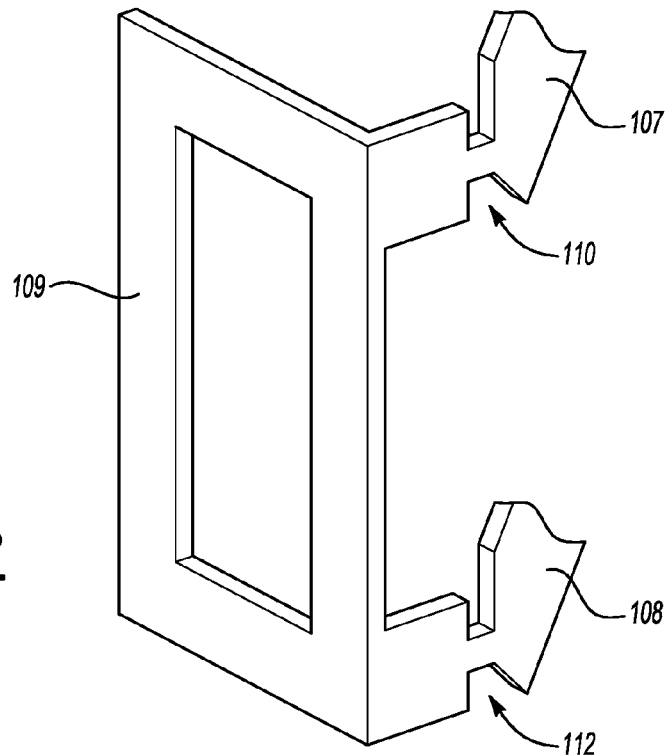
FIG. 8B shows a view similar to that of FIG. 8A, but in the deformed state.

Referring now to FIGS. 8A, 8B, upper and lower swing arms 107, 108 are attached to a retaining element 109. In this embodiment, the rear pivot axes are provided by zones 110, 112 of reduced cross-sectional area as compared with immediately adjacent areas. The zones 110, 112 are therefore weakened and provide plastically deformable joints which yield when sufficient bending moment is applied by upward/rearward movement of the radiator frame. At least one axis of at least one swing arm may be configured as a plastically deformable joint. Where the swing arm is articulated to the frame structure and/or to the radiator frame, the swing arm and/or a corresponding fastening element has a construction which permits bending of the swing arm about a bending axis by the corresponding action of force. This bending axis thus corresponds to the pivot axis. Such a bending axis is formed by, for example, the swing arm being formed in the region of the bending axis partially as a flat metal plate, the metal plate only having a low bending stiffness in the direction of thickness. Then, with the action of force on the swing arm, said swing arm is plastically bent about this region automatically. In this manner, the construction of the articulation may be substantially simplified.

The disclosed construction has the advantage that in the region of the front module an extremely large deformation region is provided which optimally absorbs the impact energy and protects both occupants and pedestrians, whilst at the same time the radiator remains relatively undamaged at least in the event of an impact at low vehicle speeds. Moreover, by the arm design of the four-bar linkage, a predetermined movement path of the radiator frame may be predetermined which moves the radiator frame with the radiator into a predetermined position in which, depending on the construction of the engine compartment, sufficient space is present for the radiator frame carrying the radiator.

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Forward structure of a motor vehicle comprising:
   a frame structure;
   a bumper beam disposed forward of and connected to the frame structure;
   a radiator frame disposed forward of the frame structure and behind the bumper beam; and
   first and second swing arms connected to the radiator frame at respective first and second forward pivot axes and connected to the frame structure at respective first and second rear pivot axes, the four pivot axes being parallel to one another and substantially transverse to the vehicle, such that a frontal impact urging the bumper beam rearward against the radiator frame causes the radiator frame to pivot about the swing arms.

2. The apparatus of claim 1, wherein a forward portion of the frame structure adjacent to the bumper beam comprises a deformation element.

3. The apparatus of claim 1, further comprising a retaining element mounted to the frame structure and having pivot points supporting the rear pivot axis of each swing arm.

4. The apparatus of claim 1, wherein the forward pivot axis of each swing arm is disposed higher than its respective rear pivot axis.

5. The apparatus of claim 1, wherein the rear pivot axes of the first and second swing arms are disposed one above the other in a substantially vertical plane.

6. The apparatus of claim 1, wherein the first and second swing arms are of equal length.

7. The apparatus of claim 1, wherein the swing arms are parallel to one another.

8. The apparatus of claim 1, wherein a first spacing between the rear pivot axes is not equal to a second spacing between the forward pivot axes.

9. The apparatus of claim 1, wherein at least one pivot axis comprises a plastically deformable joint.

10. The apparatus of claim 2, further comprising a contact block disposed on at least one of the bumper beam and the radiator frame at a location to be sandwiched between the radiator frame and the bumper beam after deformation of the deformation element.

11. The apparatus of claim 10, wherein the contact block is formed at least partially of a resilient material.

12. A front-end structure for a motor vehicle comprising:
    a left and a right deformation member mounted forward of a front frame structure;
    a bumper beam mounted to the deformation members and forward of the front frame structure;
    a radiator frame disposed forward of the front frame structure and behind the bumper beam;
    a left pair of swing arms disposed in an over-under arrangement relative to one another, each swing arm connected to the radiator frame at a forward pivot axis and connected to the front frame structure at a rear pivot axis; and
    a right pair of swing arms disposed in an over-under arrangement relative to one another, each arm of the right pair connected to the radiator frame at a forward pivot axis and connected to the front frame structure at a rear pivot axis, the four pivot axes being parallel to one another and substantially transverse to the vehicle, such that a frontal impact deforming the deformation members and urging the bumper beam rearward against the radiator frame causes the radiator frame to pivot about the swing arms.

* * * * *